Figure 1:
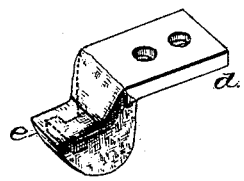

(No Model.)

C. H. BAYLEY.
COVER FASTENING DEVICE FOR SEWING MACHINES.

No. 316,108. Patented Apr. 21, 1885.

Witnesses.
John F. C. Prinkert
Fred A. Powell

Inventor
Charles H. Bayley
by Crosby & Gregory
Attys.

United States Patent Office.

CHARLES H. BAYLEY, OF BOSTON, MASS., ASSIGNOR TO THE WHEELER & WILSON MANUFACTURING COMPANY, OF BRIDGEPORT, CONN.

COVER-FASTENING DEVICE FOR SEWING-MACHINES.

SPECIFICATION forming part of Letters Patent No. 316,108, dated April 21, 1885.

Application filed August 28, 1882. (No model.)

*To all whom it may concern:*

Be it known that I, CHARLES H. BAYLEY, of Boston, county of Suffolk, State of Massachusetts, have invented an Improvement in Cover-Fastening Devices for Sewing-Machines, of which the following description, in connection with the accompanying drawings, is a specification.

This invention relates to that class of locking devices for sewing-machine covers which are made as hooks to be inserted in holes in the top of the sewing-machine table and project therein in such manner as that, when the front portion of the cover is locked to the table the whole of said cover is locked in place.

The invention consists in the peculiar and improved construction of sewing-machine cover-fastening device hereinafter particularly pointed out in the claim, and shown in the drawings.

Figure 2:
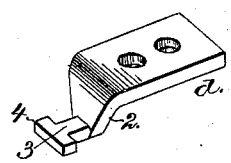

In the drawings, Figure 1 is a perspective view of the device complete and ready for attachment to the sewing-machine cover, and Fig. 2 is a detail in perspective of the metal portion of said device.

I make my improved fastening-hooks with a flat plate, *d*, having screw-holes or other common means for fastening it to the edge of the cover. The said plate has formed with it a head which extends as a hook, and is made by bending the metal downward at a suitable angle, as indicated at 2, and a further bend outwardly, as indicated at 3. This last portion has projections 4, which hold the rubber molded thereabout.

The metal portion, constructed as shown and just described, is placed in a suitable mold, and has rubber cast about the head and bent portions thereof in such manner as to form a hook, as indicated at *e*.

It will be seen that when my improved lug is attached to the sewing-machine cover nothing but the apparently solid rubber hook projects beyond the edge thereof, and so far as injuring the sewing-machine or furniture, it is as harmless as if it were made entirely of rubber, at the same time it possesses the necessary rigidity by reason of the inner metal core.

I am well aware that metal projections in various instances have been covered or provided with rubber to form cushions to prevent scratching of furniture and noise. Therefore I do not broadly claim such an application of that material; but

What I claim is—

The improved fastening-hook for the covers of sewing-machines, consisting of the metal fastening-plate *d* and the head or lug formed therewith, shown and described as bends 2 and 3, the latter having holding projections 4 combined with rubber cast entirely around said head or lug in the form of a hook, as set forth.

In testimony whereof I have signed my name to this specification in the presence of two subscribing witnesses.

CHARLES H. BAYLEY.

Witnesses:
G. W. GREGORY,
FRED A. POWELL.